United States Patent
Sawada

(10) Patent No.: US 7,167,284 B2
(45) Date of Patent: Jan. 23, 2007

(54) IMAGE SENSOR HEAD PROVIDED WITH SEPARATE CCD SENSOR CHIP AND DRIVER CHIP

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 817 days.

(21) Appl. No.: 10/293,220

(22) Filed: Nov. 12, 2002

(65) Prior Publication Data

US 2003/0123106 A1 Jul. 3, 2003

(30) Foreign Application Priority Data

Nov. 13, 2001 (JP) ............................. 2001-347255

(51) Int. Cl.
*H04N 1/04* (2006.01)
(52) U.S. Cl. ...................... 358/483; 358/474; 358/482; 250/208.1
(58) Field of Classification Search ................ 358/483, 358/482, 472, 473, 512–514, 484, 487, 475, 358/509, 497, 494, 505, 506; 250/208.1, 250/234–236, 216, 239; 257/724, 678, 680, 257/690; 382/312, 313, 318, 319
See application file for complete search history.

(56) References Cited

U.S. PATENT DOCUMENTS

| | | | | |
|---|---|---|---|---|
| 4,472,744 A | * | 9/1984 | Inoue et al. | ................. 358/483 |
| 4,644,411 A | * | 2/1987 | Sato et al. | ................. 250/208.1 |
| 4,682,042 A | * | 7/1987 | Igarashi | ................. 250/208.1 |
| 5,182,445 A | * | 1/1993 | Yamashita | ................. 250/208.1 |
| 5,495,277 A | * | 2/1996 | Imamura et al. | ............. 347/171 |
| 5,859,421 A | * | 1/1999 | Onishi et al. | ............. 250/208.1 |
| 6,157,072 A | * | 12/2000 | Nakayama et al. | ......... 257/443 |
| 6,184,513 B1 | | 2/2001 | Sawada | .................... 250/208.1 |

FOREIGN PATENT DOCUMENTS

| | | |
|---|---|---|
| JP | 2-362 | 1/1990 |
| JP | 3-3361 | 1/1991 |
| JP | 4-113767 | 4/1992 |

OTHER PUBLICATIONS

Japanese Office. Action for corresponding Japanese application Serial No. 2001-347255. mailed Jun. 27, 2006.

* cited by examiner

*Primary Examiner*—Cheukfan Lee
(74) *Attorney, Agent, or Firm*—Hamre, Schumann, Mueller & Larson, P.C.

(57) ABSTRACT

An image sensor head includes a sensor chip provided with a CCD sensor, and a driver chip provided with a control circuit for controlling the CCD sensor. The control circuit is composed of MOS elements. The sensor chip and the driver chip are separate from each other and are electrically connected to each other via a conductive wire. A power source for driving the sensor chip and a power source for driving the driver chip are individually provided.

9 Claims, 5 Drawing Sheets

IMAGE SENSOR HEAD PROVIDED WITH SEPARATE CCD SENSOR CHIP AND DRIVER CHIP

BACKGROUND OF THE INVENTION

1. Field of the Invention

The present invention relates to an image sensor head to be built in an image reading apparatus.

2. Description of the Related Art

Conventionally, an image reading apparatus such as a contact-type scanner incorporates an image capturing unit (image sensor head) utilizing a complementary metal oxide semiconductor (CMOS). Generally, such a CMOS-type image reading apparatus has an advantage that its electric power consumption is lower than that of an image reading apparatus utilizing a charge-coupled device (CCD). However, with respect to the image quality, the CMOS-type apparatus is usually inferior to the CCD-type apparatus. Recently, therefore, an image reading apparatus with an image sensor head which utilizes a CCD sensor as the light receiving means has been put on the market.

Such a prior-art image sensor head has the following structure, for example. The image sensor head includes a rectangular insulating substrate for mounting various components. On the substrate, a plurality of CCD sensor chips are arranged in a row extending longitudinally of the substrate. Each of the sensor chips includes a plurality of light receiving elements arranged in a row extending longitudinally of the substrate. Each sensor chip further incorporates a driver circuit for driving and controlling the light receiving elements. Generally, CMOS elements are used for constituting the driver circuit for the purpose of reducing the electric power consumption. The driver circuit includes a signal amplification section, a switching section and the like.

In the prior-art image sensor head, the plural light receiving elements and the driver circuit for controlling the light receiving elements are built in a single chip. Therefore, in forming the head, the handling of the components is advantageously easy. However, such a "one-chip-structure" causes the following problems.

Generally, the voltage necessary for operating the CCD-type light receiving elements differ from the voltage necessary for operating the driver circuit. Therefore, in the prior-art "one-chip-structure", after a predetermined drive voltage is supplied from the outside to each of the sensor chips, the supplied voltage need be transformed to a voltage suitable for operating the light receiving elements or to a voltage suitable for operating the driver circuit (or to both) by using a transformer circuit provided in the chip. However, such transforming is not desirable, because it causes power dissipation (an increase in the power consumption).

Moreover, in the prior-art "one-chip-structure", the following problem occurs in trying to enhance the image reading accuracy. To enhance the image reading accuracy, the number of light receiving elements in the CCD sensor chip need be increased. However, when the number of the light receiving elements is just increased, the time required for reading one line increases. Therefore, to increase the image reading speed, measures need be taken such as using of a high-speed-type amplifier and the like for the driver circuit and increasing of the frequency of a control clock signal. Generally, as the frequency of the control clock signal increases, the load on the driver circuit increases, which leads to an increase in the electric power consumption in the driver circuit. As described above, in the prior art "one-chip-structure", the light receiving elements and the driver circuit share a single driving power source. Therefore, when the power consumption in the driver circuit increases, a sufficient drive voltage may not be supplied to the light receiving elements. In such a case, the light receiving elements do not operate properly so that the image reading accuracy may be deteriorated.

SUMMARY OF THE INVENTION

An object of the present invention, which is conceived under the circumstances described above, is to provide an image sensor head which is capable of realizing high image reading speed while preventing an increase in the electric power consumption and degradation of image reading accuracy.

According to a first aspect of the present invention, there is provided an image sensor head comprising a sensor chip provided with a CCD sensor and a driver chip provided with a control circuit for controlling the CCD sensor. The sensor chip and the driver chip are arranged separately from each other.

Preferably, the image sensor head of the present invention further comprises a conductor for directly connecting the sensor chip to the driver chip.

Preferably, the conductor is a wire which bridges a gap between the sensor chip and the driver chip.

Preferably, the image sensor head of the present invention further comprises a first driving power source connected to the sensor chip and a second driving power source connected to the driver chip.

Preferably, the sensor chip includes a plurality of photodiodes for detecting light.

Preferably, the driver chip supplies a first clock signal and a second clock signal for controlling the CCD sensor to the sensor chip. The second clock signal is different in phase from the first clock signal.

Preferably, the second clock signal is generated in the driver chip based on the first clock signal.

Preferably, the control circuit provided in the driver chip is composed of metal oxide semiconductor (MOS) elements.

According to a second aspect of the present invention, there is provided an image reading apparatus comprising an insulating substrate, a light source mounted on the substrate for illuminating a document to be read, a lens unit for converging light reflected by the document, and detecting means for detecting the converged reflected light. The detecting means includes a sensor chip provided with a CCD sensor and a driver chip provided with a control circuit for controlling the CCD sensor. The sensor chip is arranged separately from the driver chip.

Other objects, features and advantages of the present invention will become clearer from the description of the preferred embodiment given below.

DETAILED DESCRIPTION OF THE PREFERRED EMBODIMENTS

Preferred embodiments of the present invention will be described below in detail with reference to the accompanying drawings.

Figure 1:
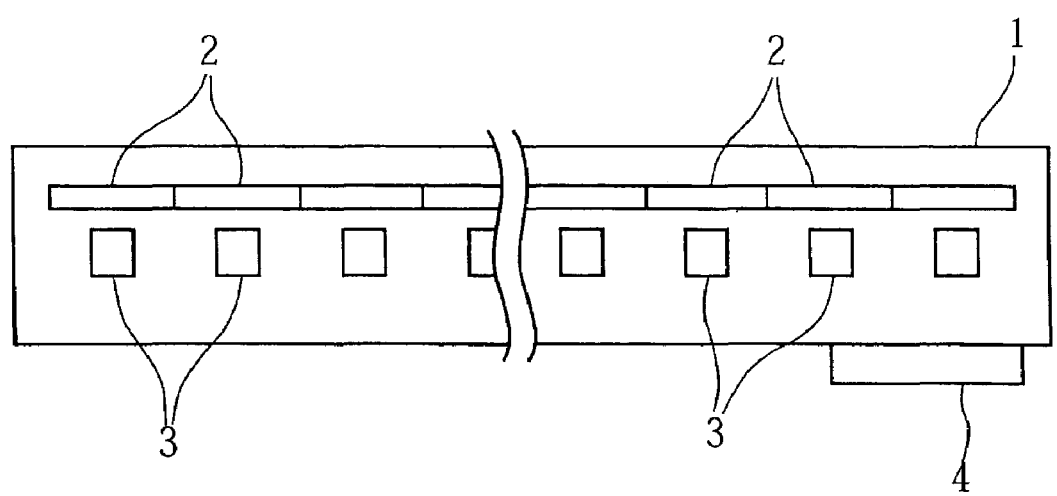
FIG. 1 is a plan view illustrating an example of image sensor head according to the present invention.

As shown in FIG. 1, an image sensor head according to the present invention includes an insulating substrate 1 formed of a ceramic material, for example. The substrate 1, which is rectangular, has an upper surface on which are mounted a plurality of CCD sensor chips 2 arranged in a row and driver chips 3 for controlling the operation of the CCD sensor chips. The substrate 1 is formed with a wiring pattern (See FIG. 2) for electrically connecting the driver chips 3 to each other. The substrate 1 is formed, at a longitudinal edge thereof, with a connector 4 as a signal connection portion for an external circuit.

Figure 2:
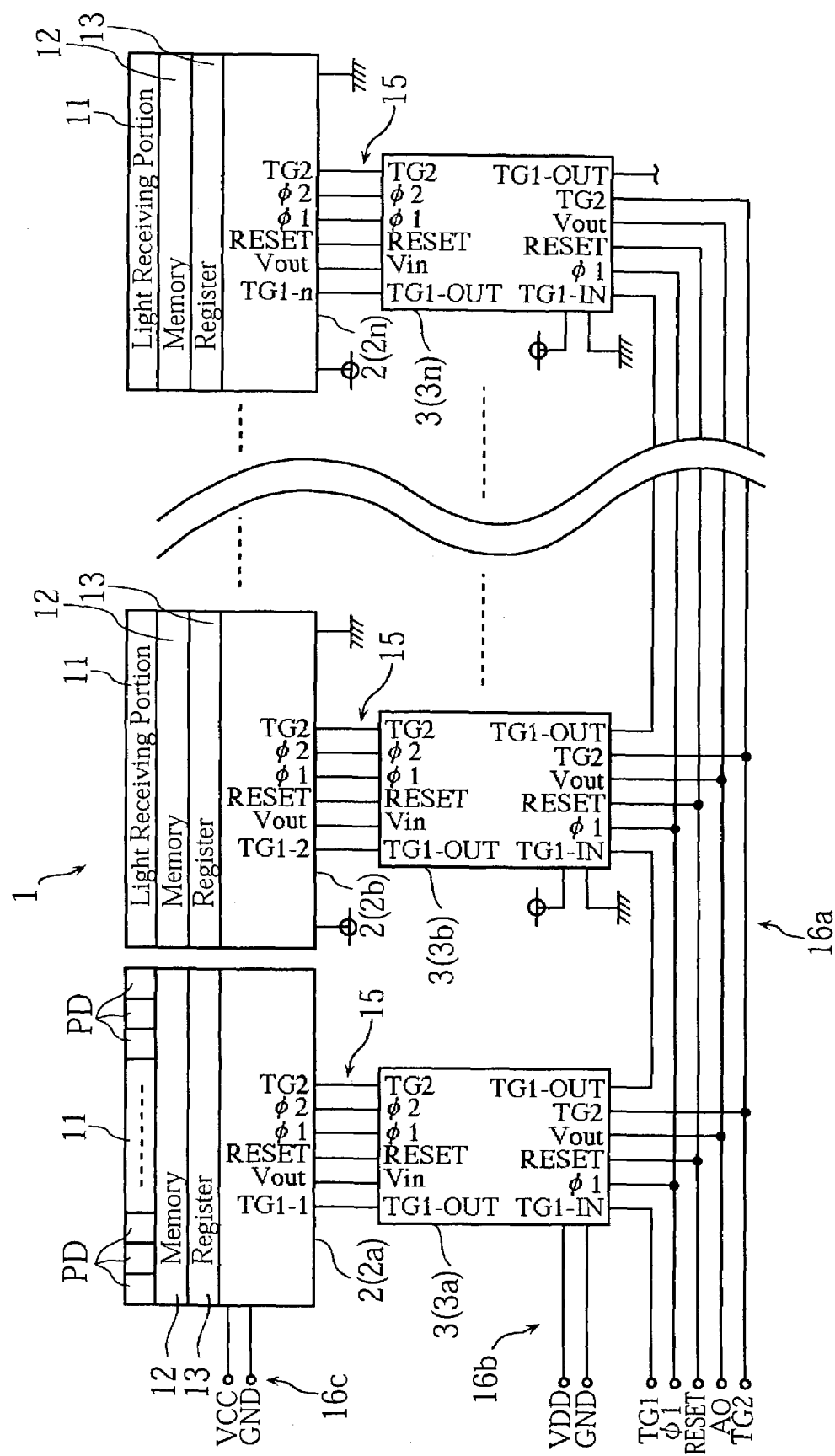
FIG. 2 is a block diagram illustrating the structure of a main circuit of the image sensor head shown in FIG. 1.

As shown in FIG. 2, each of the CCD sensor chips 2 incorporates a light receiving portion 11 capable of performing photo-electric conversion, a memory 12 for storing electric charge obtained at the light receiving portion, and a register 13 for transferring the electric charge. The light receiving portion 11 includes a plurality of photodiodes PD arranged longitudinally of the CCD sensor chip 2 at a predetermined pitch. (See the leftmost chip 2a in the figure. Other chips 2b–2n also have the same structure.)

Each of the driver chips 3 receives an image signal transmitted from a corresponding one of the CCD sensor chips 2 and outputs the signal to the outside. The driver chip 3 incorporates a control circuit which utilizes a CMOS (or BiCMOS). The control circuit includes an amplification section, a counter section, an analog switch section and a chip select section and the like.

Each driver chip 3 is directly connected to the corresponding CCD sensor chip 2 via a plurality of control signal lines 15. Each of the signal lines 15 may be a wire formed of gold, for example (See FIG. 5). Wire bonding is more advantageous, in various points, than forming a wiring pattern on the substrate 1 and connecting the driver chip 3 to the CCD sensor chip 2 via the wiring pattern. Specifically, wire bonding can be performed at a lower cost than forming a wiring pattern. Further, the direct connection of the chip 2 to the chip 3 by wire bonding effectively prevents noises from mixing into the signals exchanged between the chips 2 and 3. The signals transmitted through the control signal lines 15 include a first trigger signal TG1, a second trigger signal TG2, an output signal Vin (or Vout), are set signal RESET, a clock signal $\phi 1$ and an inverted clock signal $\phi 2$.

As shown in FIG. 2, the substrate 1 is formed with wiring patterns (16a–16c) which are connected to an external circuit via the connector 4. As shown in the figure, the wiring pattern 16a connects the plural driver chips 3 to each other and transmits the first trigger signal TG1, the second trigger signal TG2, an analog output signal AO, the reset signal RESET and the clock signal $\phi 1$. The wiring pattern 16b supplies a drive voltage VDD to each driver chip 3 while providing grounding for the chip 3. Similarly, the wiring pattern 16c supplies a drive voltage VDD to each CCD sensor chip 2 while providing grounding for the chip 2.

The first trigger signal TG1 is a timing signal for selectively operating each driver chip 3 and each CCD sensor chip 2. As shown in FIG. 2, the signal line for transmitting the first trigger signal TG 1 connects the plural driver chips (3a–3n) to each other in the form of a daisy chain. Specifically, the connector 4 has a trigger signal terminal (TG1) connected to a TG1 -IN terminal of the first driver chip 3a. The first driver chip 3a has a TG1-OUT terminal connected to a TG1-IN terminal of the second driver chip 3b. Similarly, with respect to other driver chips 3, adjacent ones are connected to each other, and the signal line is finally connected to a TG1-IN terminal of the n-th driver chip 3n. With this arrangement, the plural driver chips 3 can be operated successively.

The first trigger signal TG1 supplied to each driver chip 3 is outputted through a TG1-OUT terminal and supplied to the corresponding CCD sensor chip 2.

The second trigger signal TG2 is a timing signal for instructing the driver chips 3 and the CCD sensor chips 3 to start the image reading for one line. The second trigger signal TG2 is simultaneously fed to each of the driver chips 3 through the wiring pattern 16a. The second trigger signal TG2 thus fed is transmitted from each driver chip 3 to the corresponding one of the CCD sensor chips 2.

The analog output signal AO is an image signal detected at each of the CCD sensor chips 2. Through a Vout terminal of the CCD sensor chip 2, the image signal is inputted into a Vin terminal of the corresponding one of the driver chips 3. Thereafter, the image signal is outputted from a Vout terminal of the driver chip 3 and supplied to an output signal terminal (AO) of the connector 4 through the wiring pattern 16a.

The clock signal $\phi 1$, which has a frequency of 10–20 MHz, is fed to each of the driver chips 3 through the wiring pattern 16a. The frequency of the clock signal $\phi 1$ is higher than the frequency (about 2–5 MHz) of the clock signal in the prior-art image sensor head.

The clock signal $\phi 2$ is a phase-inverted signal of the clock signal $\phi 1$ and has a phase shifted by 180 degree relative to the clock signal $\phi 1$. The clock signal $\phi 2$ is generated at each of the driver chips 3 based on the clock signal $\phi 1$. The clock signal thus generated is fed from the driver chip 3 to the corresponding one of the CCD sensor chips 2.

The reset signal RESET is supplied through the wiring pattern 16a to each of the driver chips 3 and then fed from the driver chip 3 to the corresponding CCD sensor chip 2. When the reset signal RESET is supplied, the residual electric charge is removed from the CCD sensor chip 2. (That is, the memory 12 is reset.)

Figure 3:
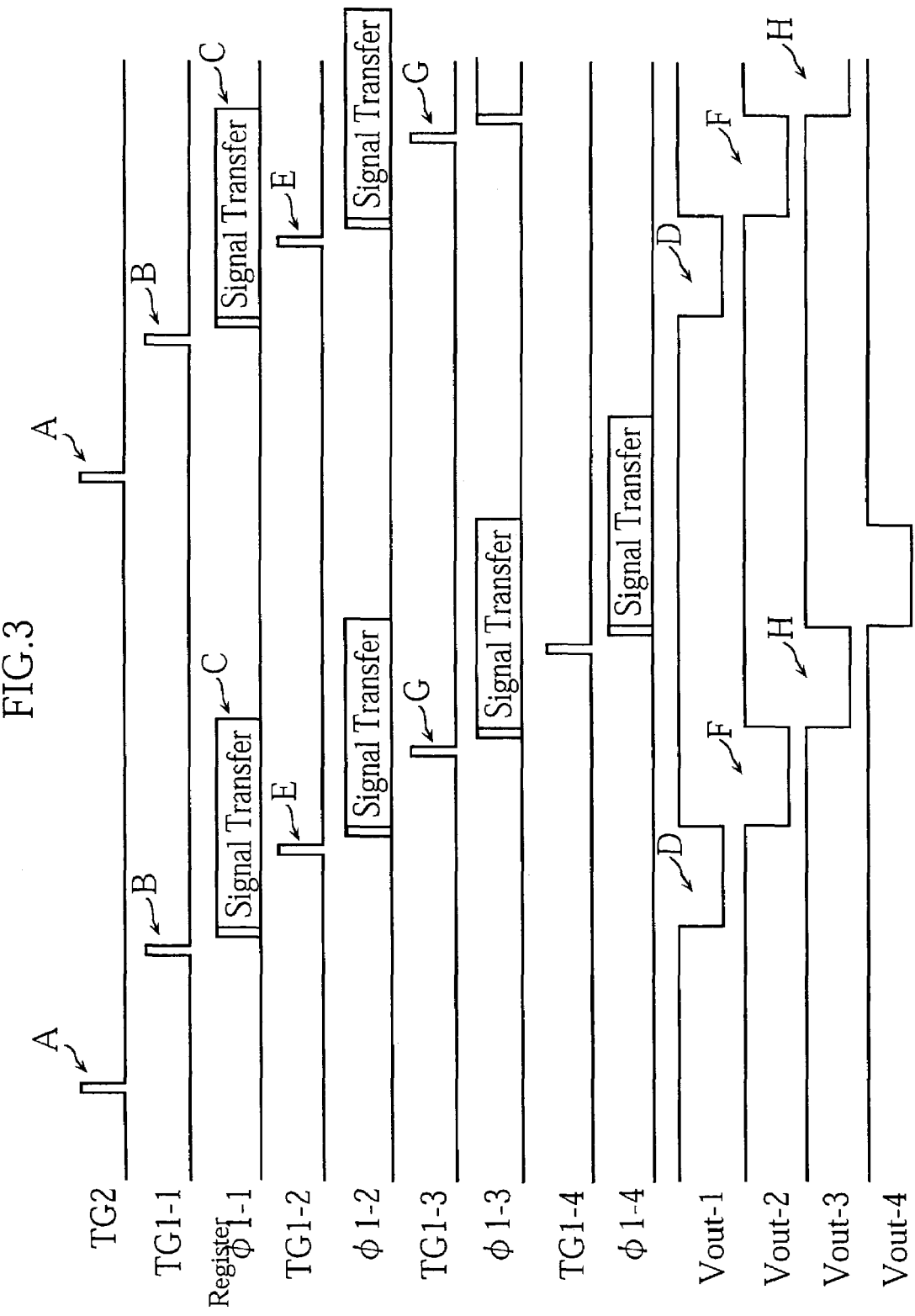
FIGS. 3 and 4 are timing charts showing the operation of the image sensor head according to the present invention.
Figure 4:
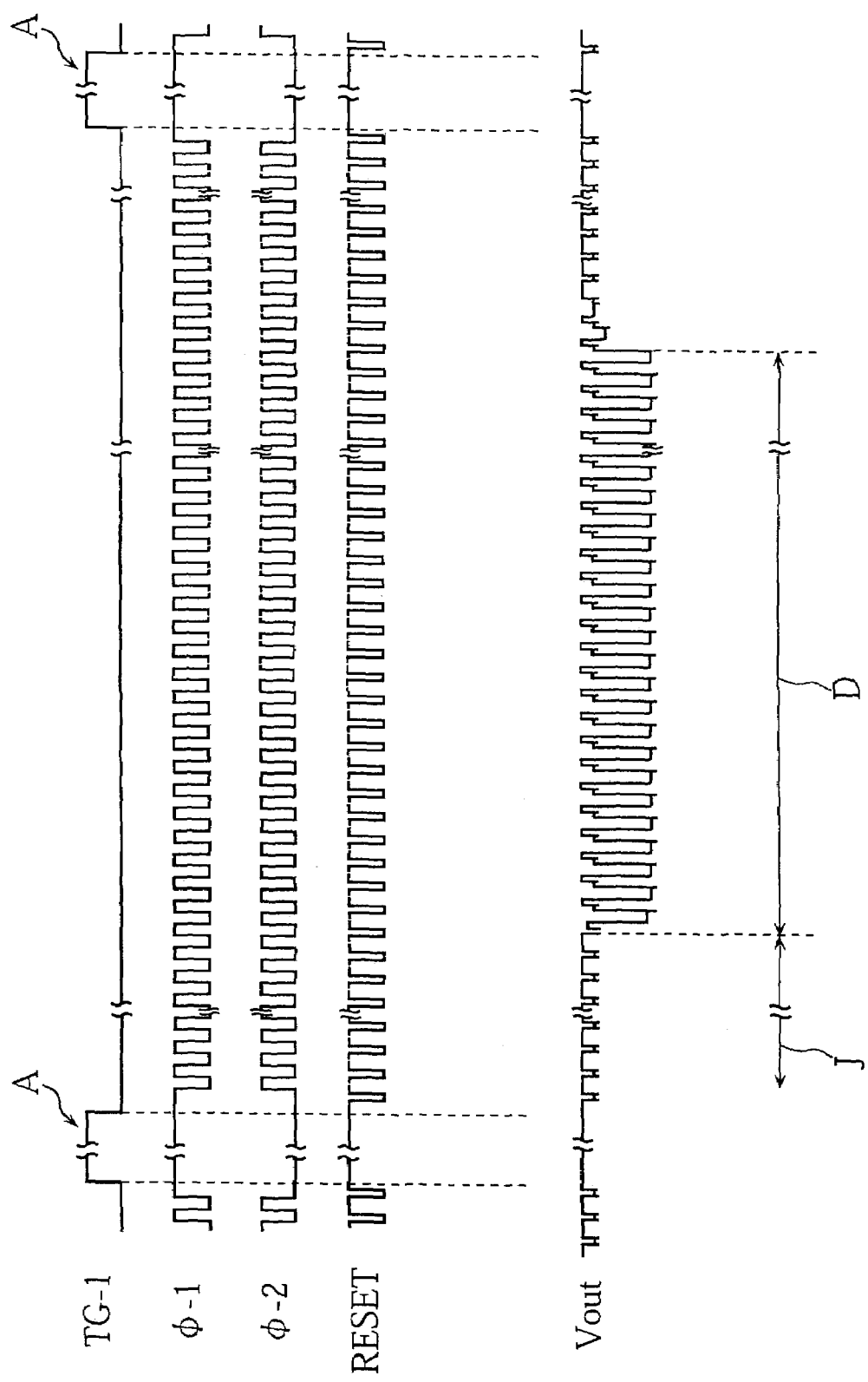

Next, the operation of the image sensor head of the present invention will be described with reference to the timing charts shown in FIGS. 3 and 4. The timing chart of FIG. 3 illustrates the operation in the case where four CCD sensor chips (and therefore, four driver chips) are provided. As is obvious to those skilled in the art, this is just an example, and the present invention is not limited to this example.

The clock signal $\phi 1$ inputted through the connector 4 (FIG. 1) is supplied to each of the driver chips 3 through the wiring pattern 16a. Based on the clock signal $\phi 1$ thus supplied, an inverted clock signal $\phi 2$ is generated at each driver chip 3 (See FIG. 4). The clock signal $\phi 1$ and the inverted clock signal $\phi 2$ are supplied from the driver chip 3 to the corresponding CCD sensor chip 2.

The reset signal RESET is supplied to each of the CCD sensor chips 2 through the driver chip 3. As shown in FIG. 4, the reset signal RESET is given in synchronism with the rising edge of the clock signal $\phi 1$. Upon receiving the reset signal RESET, each CCD sensor chip 2 resets the memory 12. (The residual electric charge is removed.)

The second trigger signal T2 (See the reference sign A in FIG. 3) is inputted into each of the driver chips 3 through the wiring pattern 16a and then inputted from the driver chip 3 into the corresponding CCD sensor chip 2. The supplying of the second trigger signal TG2 means the starting of the image reading operation for one line.

The first trigger signal TG1 is inputted into the plural driver chips 3 at a predetermined time interval. (See TG1-1, TG1-2, TG1-3 and TG1-4 in FIG. 3.)

First, the first trigger signal TG 1 is inputted into the first driver chip 3a and the first CCD sensor chip 2a (B in FIG. 3). As a result, image reading is started at the first CCD sensor chip 2a. After the first trigger signal TG1 is inputted, the electric charge stored at the plural photodiodes PD in the chip 2a is transferred via the memory 12 and the register 13 in synchronism with the clock signal ϕ1 or the inverted clock signal ϕ2 (See C in FIG. 3). As a result, an image reading signal Vout as a serial analog output signal is outputted to the first driver chip 3a. At the driver chip 3a, the image reading signal Vout is amplified to a predetermined level with a high-speed amplifier (not shown). Thereafter, the image reading signal is outputted toward the terminal AO of the connector 4 (See the reference sign D in FIGS. 3 and 4). The reference sign J in FIG. 4 indicates the period during which signals are outputted from dummy pixels (invalid pixels).

While the signal transfer is performed at the first CCD sensor chip 2a, the first driver chip 3a transmits the first trigger signal TG1 (See E in FIG. 3) to the second driver chip 3b. This transmission is performed after a predetermined time has elapsed since the first trigger signal TG1 was supplied to the first driver chip 3a.

The second driver chip 3b transmits the trigger signal TG1 to the second CCD sensor chip 2b. Thereafter, similarly to the case of the first CCD sensor chip 2a, the image reading signal Vout is outputted from the second CCD sensor chip 2b to the second driver chip 3b. Specifically, the electric charge stored at the plural photodiodes in the light receiving portion 11 is transferred via the memory 12 and the register 13 in synchronism with the clock signal (ϕ1–2) or the inverted clock signal. As a result, the image reading signal Vout is serially outputted to the second driver chip 3b. At the driver chip 3b, the image reading signal Vout is amplified to a predetermined level with a high-speed amplifier (not shown). Thereafter, the image reading signal is outputted toward the terminal AO of the connector 4 (See the reference sign F in FIG. 3). In this way, subsequent to the image reading signal (Vout-1) from the first CCD sensor chip 2a, the image reading signal (Vout-2) from the second CCD sensor chip 2b is outputted toward the analog output signal terminal AO.

While the signal transfer is performed at the second CCD sensor chip 2b, the second driver chip 3b transmits the first trigger signal TG1 (See G in FIG. 3) to the third driver chip (not shown). As a result, the third driver chip 3 operates the third CCD sensor chip (not shown) so that the image reading signal Vout-3 (See H in FIG. 3) obtained by the third CCD sensor chip is outputted toward the terminal AO.

The analog image reading signals Vout outputted in this way are subjected to the A/D conversion process and the like.

As shown in FIG. 2, in the image sensor head according to the present invention, the driver chips 3 are provided separately from the CCD sensor chips 2, each driver chip incorporating a control circuit by a CMOS which can operate with relatively low power consumption. Moreover, the drive voltage (VDD) for the driver chips 3 is supplied separately from the drive voltage (VCC) for the CCD sensor chips 2. With this arrangement, it is possible to supply, to the sensor chips 2 and to the driver chips 3, a drive voltage capable of optimizing the operation performance without causing interference. Moreover, as compared with the prior art structure, such individual supply of two kinds of drive voltage can reduce the power dissipation occurring in the circuit. (It is to be noted that, in the prior art structure, necessary voltages are obtained through the transformer circuit provided in the chip.)

Figure 5:
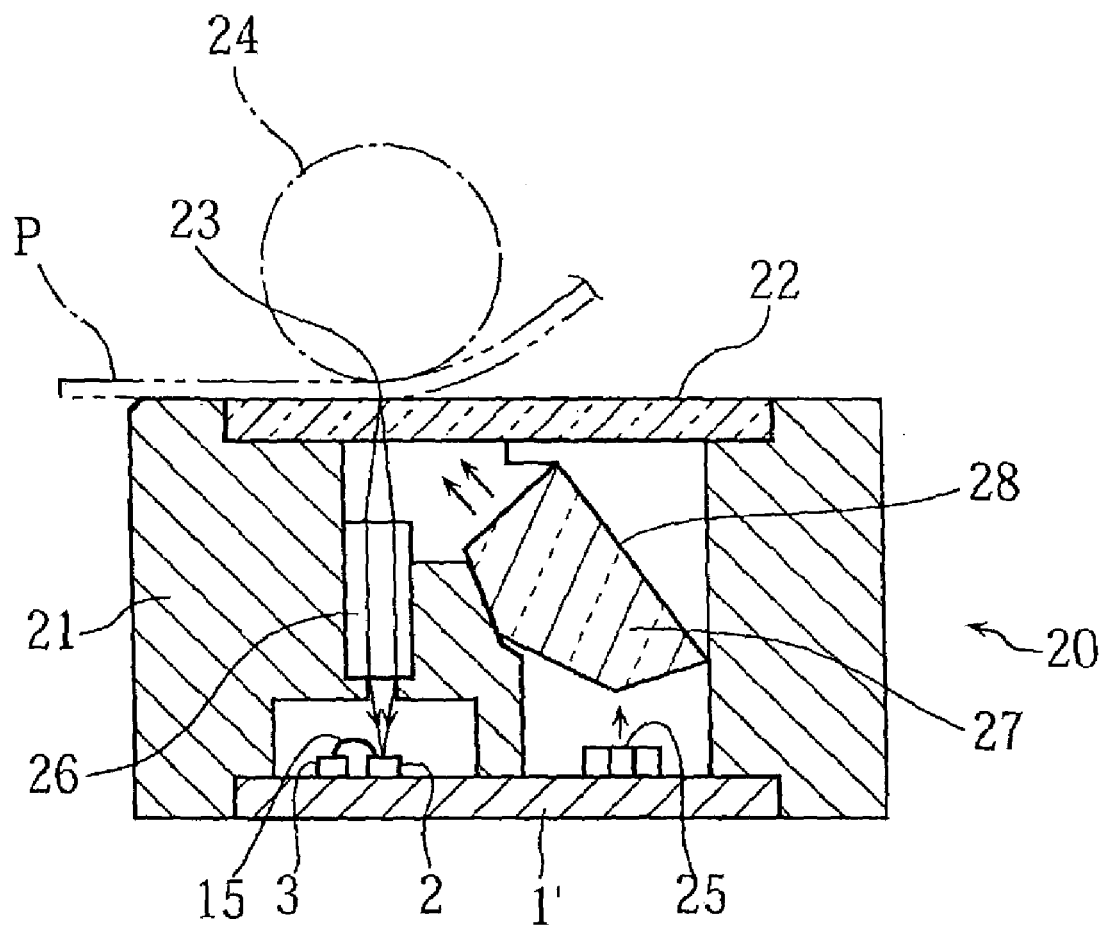
FIG. 5 is a sectional view illustrating the main structure of an image reading apparatus incorporating the image sensor head of the present invention.

FIG. 5 is a sectional view illustrating the main structure of a contact-type image reading apparatus 20 incorporating the above-described image sensor head. As shown in the figure, the apparatus 20 includes a housing 21 on which a transparent document supporting panel 22 is mounted. The document supporting panel 22 has an obverse surface provided with a linear image read region 23. A platen roller 24 for transferring a document P in the secondary scanning direction is provided above the image read region 23.

In the housing 21 is provided LED light sources 25 for illuminating the image read region 23. Further, a lens unit 26 for converging light is provided directly below the image read region 23. The light conversing lens unit 26 may be a rod lens array comprising a plurality of rod lenses connected in series. The housing 21 is provided, at the bottom thereof, with a substrate 1' on which are mounted the CCD sensor chips 2 and the driver chips 3 described with reference to FIGS. 2–4 in addition to the light sources 25.

The light emitted from the light sources 25 is reflected by a prism 27 or a reflector 28 before it reaches the image read region 23 to impinge on the surface of the document P. The light reflected by the document P is converged by the lens unit 26 onto the light receiving surfaces of the CCD sensor chips 2. The CCD sensor chips 2 serially output image signals corresponding to the received amount of light.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

The invention claimed is:

1. An image sensor head comprising:
   a sensor chip provided with a charge-coupled device (CCD)) sensor;
   a driver chip provided with a control circuit for controlling the CCD sensor;
   a first driving power source connected to the sensor chip; and
   a second driving power source connected to the driver chip;
   the sensor chip and the driver chip being arranged separately from each other.

2. The image sensor head according to claim 1, further comprising a conductor for directly connecting the sensor chip to the driver chip.

3. The image sensor head according to claim 2, wherein the conductor is a wire which bridges a gap between the sensor chip and the driver chip.

4. The image sensor head according to claim 1, wherein the sensor chip includes a plurality of photodiodes for detecting light.

5. The image sensor head according to claim 1, wherein the driver chip supplies a first clock signal and a second clock signal for controlling the CCD sensor to the sensor chip, the second clock signal being different in phase from the first clock signal.

6. The image sensor head according to claim 5, wherein the second clock signal is generated in the driver chip based on the first clock signal.

7. The image sensor head according to claim 1, wherein the control circuit provided in the driver chip comprises metal oxide semiconductor (MOS) elements.

8. An image reading apparatus comprising:
an insulating substrate;
a light source mounted on the substrate for illuminating a document to be read;
a lens unit for converging light reflected by the document; and
detecting means for detecting the converged reflected light;
the detecting means including a sensor chip provided with a charge-coupled device (CCD) sensors, a driver chip provided with a control circuit for controlling the CCD sensor, a first driving power source connected to the sensor chip, and a second driving power source connected to the driver chip;
the sensor chip being arranged separately from the driver chip.

9. An image sensor head comprising:
a sensor chip provided with a charge-coupled device (CCD) sensor; and
a driver chip provided with a control circuit for controlling the CCD sensor;
the sensor chip and the driver chip being arranged separately from each other;
wherein the driver chip supplies a first clock signal and a second clock signal for controlling the CCD sensor to the sensor chip, the second clock signal being different in phase from the first clock signal.

* * * * *